Apr. 24, 1923. 1,452,620
E. A. SPERRY
METHOD OF TREATING WHITE LEAD
Filed Nov. 20, 1919
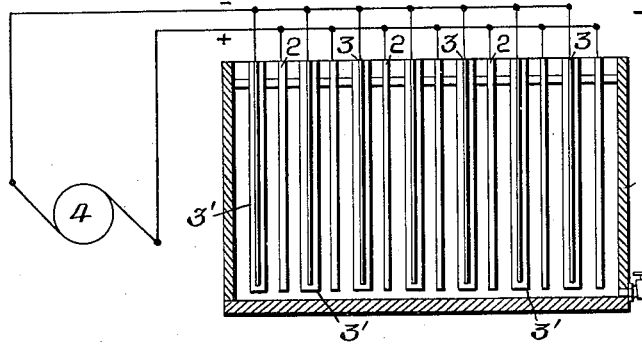
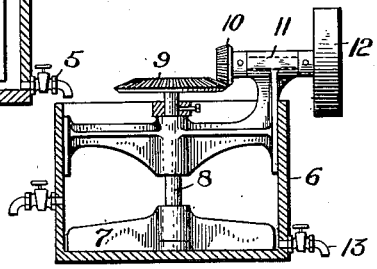
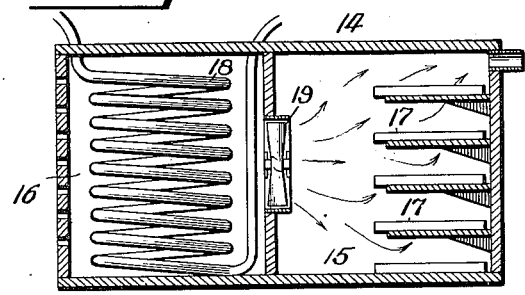
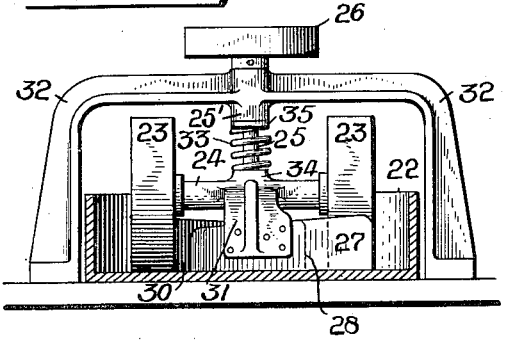
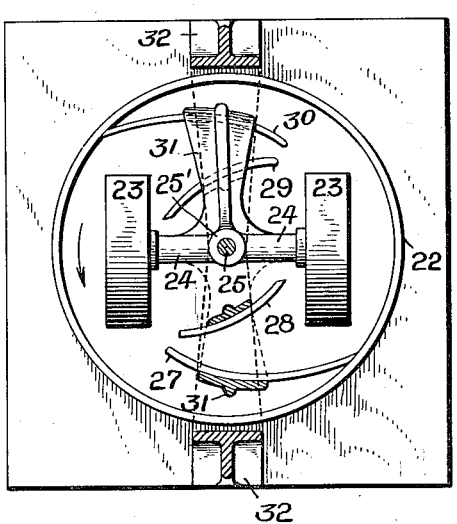
INVENTOR
ELMER A. SPERRY.
BY
Herbert H. Thompson
HIS ATTORNEY Patented Apr. 24, 1923.

1,452,620

UNITED STATES PATENT OFFICE.

ELMER A. SPERRY, OF BROOKLYN, NEW YORK, ASSIGNOR TO ANACONDA LEAD PRODUCTS COMPANY.

METHOD OF TREATING WHITE LEAD.

Application filed November 20, 1919. Serial No. 339,300.

*To all whom it may concern:*

Be it known that I, ELMER A. SPERRY, a citizen of the United States of America, residing at 1505 Albermarle Road, Brooklyn, New York, in the county of Kings and State of New York, have invented certain new and useful Improvements in Methods of Treating White Lead, of which the following is a specification.

This invention relates to an improved method of changing the physical characteristics of pigments. More particularly it relates to a process for changing the oil absorption capacity and other important qualities of lead pigments. In the patent to R. M. Harrington, Serial No. 1,308,948, issued July 8, 1919, is disclosed a method of electrolytically producing lead pigments such as white lead. As is well known, white lead must be ground in linseed or equivalent oil to form a paste which is stirred into a further quantity of oil or menstruum with the desired coloring matter if any to produce paint. The white lead sold to the trade is the lead after it is ground in oil by manufacturers making a specialty of this process. The white lead as originally produced by the process disclosed in the above mentioned patent to Harrington is generally much more finely divided or comminuted as well as flocculent and tends to be lighter and more bulky than white lead made by the old standard and slow process. It possesses greater whiteness and covering power, but it is also found that, when being ground in oil it tends to absorb a greater amount of oil than is absorbed by white lead produced by the old process, and for these reasons among others the standardized processes and mixtures of the oil grinding manufacturers would not be applicable to the new product. I have, however, devised a process new in this art by means of which I treat this new product whereby the bulk and apparent density and the oil absorption capacity of the white lead produced as disclosed in the Harrington patent is reduced, so that such white lead so treated absorbs no more oil than is absorbed by the older process white lead and such standardized manufacturing processes are fully applicable and may be employed. At the same time the other peculiar properties of the new lead, such as increased whiteness, covering power, tinting value, and opacity are all retained. It should be understood that the process may be arrested at any point and the properties of the resulting product thus controlled.

Although my method is independent of any particular type of apparatus, I have illustrated more or less diagrammatically in the drawing certain apparatus by means of which the process may be conveniently carried out.

Referring to the drawing:

Fig. 1 is a diagrammatic view of an electrolytic cell and a washing apparatus.

Fig. 2 is a longitudinal section through a drier.

Fig. 3 is a front elevation of a grinding means.

Fig. 4 is a plan view of the grinding means of Fig. 3, parts being broken away.

In Fig. 1 I have shown an electrolytic cell 1 comprising a plurality of anodes 2 and cathodes 3, though one anode and one cathode would be sufficient. The cathodes are separated from the anodes by diaphragms 3'. A source of E. M. F. 4 is electrically connected to the cell as shown. In said cell white lead is produced as set forth fully in the patent to Harrington above mentioned, and is precipitated on the bottom of cell 1 in the form of finely divided flocculent particles forming an impalpable powder, and having a comparatively high oil absorption capacity.

The white lead thus precipitated may be drawn off at 5 and washed in tank 6 by being agitated thoroughly in liquid in said tank. While various means may be provided for accomplishing this, I have shown tank 6 as provided with paddle blades 7 on a shaft 8 which may be adapted to be rotated by the application of power as by means of gears 9 and 10, shaft 11, and pulley 12. The white lead may be removed from tank 6 at 13.

After having been washed, and preferably filtered, the white lead should be dried by any suitable means. One form of such means is shown in section in Fig. 2, wherein 14 represents a drier having two compartments 15 and 16. In compartment 15 are trays 17 on which the white lead may be placed, while in compartment 16 is a steam or other heating coil 18. A fan 19 serves to draw air over the heating coil 18 and to force it over the trays 17.

The white lead, having been dried, is now subjected to grinding under heavy pressure.

One form of grinding means is shown in Figs. 3 and 4 and may comprise a pan or receptacle 22 over the bottom of which move heavy grinding rollers 23, 23 mounted on arms 24, 24 projecting from a shaft 25 which is mounted in a suitable bearing 25' on bracket 32 and may be turned by power means through pulley 26. For the purpose of stirring the material to aid in pulverizing and in order to insure that all of the material in the receptacle 22 will be brought into the path of the grinders, suitable scrapers 27, 28, 29, and 30 may be mounted on arms 31, 31 projecting from a shaft 25. Such scrapers, if arranged as shown in Fig. 4 will, when turned with shaft 25, gather up all of the material which is not in the path of rollers 23 and bring it into said path.

If desired, arms 24, 24 may be slidable along shaft 25 as well as rotatable therewith and a spring 33, preferably a heavy spring, may be positioned between bearing 25' and hub 34 of arms 24, 24. In this manner additional pressure may be applied to aid the weight of the wheels 23, 23 in grinding the white lead. A washer 35 should preferably be interposed between the spring 33 and bearing 25' in order to permit the spring to turn readily with arms 24, 24.

I have found that by thus dry grinding white lead produced as above set forth, its capacity for oil absorption is considerably reduced, probably due to the pressing of the particles closer together and consequent reducing of the air spaces between them. At the same time the superior covering properties and exceptional whiteness are retained in full. Furthermore, the density of the white lead is increased and its flocculency diminished. Preferably the white lead should be subjected to a series of dry grindings as is evident in the type above set forth.

I am aware that it is old to grind and mix white lead with oil and other ingredients and also to reduce the size of the grain or ultimate particle by either dry or wet grinding and I lay no claim thereto. My discovery, however, relates to the grinding and preferably dry grinding of a material already "ground" so to speak, i. e. already in an extremely fine state of comminution with the definite object of altering certain of its physical characteristics and imparting qualities not already possessed by it owing in all probability to the method of its production. This general method being entirely new, the problem is also new and doubtless has never before presented itself. The solution of this problem constitutes the process described herein and specifically pointed out in the claims.

In accordance with the provisions of the patent statutes, I have herein described the principle of my invention together with the best mode in which I have contemplated applying such principle, but I desire to have it understood that the apparatus shown is only illustrative and that the kind of apparatus and the process employed may be considerably varied without departing from the spirit of my invention.

Having described my invention, what I claim as new and desire to secure by Letters Patent is:

1. The process of decreasing the oil absorption capacity of white lead in a too highly comminuted state for commercial grinding in oil which consists of dry grinding such pigment under conditions of heavy pressure until its oil absorbing properties are reduced to the desired amount.

2. The process of controlling a physical characteristic of an electrolytically produced white lead, which consists of dry grinding such pigment.

3. The process of controlling the oil absorption capacity of white lead electrically comminuted which consists of dry grinding such pigment.

4. The process of producing a pigment which consists of electrolytically depositing a basic compound of a metal in a highly pulverulent state, washing and drying the same, and then conditioning said pigment for grinding in oil by dry grinding.

5. The process of producing a pigment which consists of electrolytically depositing white lead in a highly pulverulent state, washing and drying the same, and then conditioning said pigment for grinding in oil by dry grinding.

6. The process of producing commercial white lead for paint which consists of electrolytically depositing the salt in a highly pulverulent state, washing and drying the same, dry grinding the same until the oil absorbing capacity is substantially reduced, and finally grinding in oil in substantially the same manner as white lead produced non-electrolytically is ground.

7. The process of producing commercial white lead for paint which consists of electrolytically depositing the salt in a highly pulverulent state, washing and drying the same, dry grinding the same until the oil absorbing capacity is substantially the same as that of white lead produced non-electrolytically, and finally grinding in oil.

In testimony whereof I have affixed my signature.

ELMER A. SPERRY.